United States Patent
Askin et al.

Patent Number: 5,575,921
Date of Patent: Nov. 19, 1996

[54] SLUDGE DREDGING AND DEWATERING PROCESS

[75] Inventors: Ronald C. Askin; Robert J. Kimball; Sanna M. Yost, all of Helena, Mont.

[73] Assignee: Hydrometrics, Inc., Helena, Mont.

[21] Appl. No.: 385,344

[22] Filed: Feb. 8, 1995

[51] Int. Cl.$^6$ .................... C02F 1/52; E02F 3/88
[52] U.S. Cl. .............. 210/710; 210/732; 210/747; 210/712; 210/768; 210/783; 210/800; 210/805; 37/195; 37/317; 405/73
[58] Field of Search .............. 37/195, 317, 345; 405/73; 210/768, 783, 751, 805, 710, 712, 732, 747, 800

[56] References Cited

U.S. PATENT DOCUMENTS

| | | | |
|---|---|---|---|
| 3,275,547 | 9/1966 | Bucksteeg et al. | 210/768 |
| 3,412,862 | 11/1968 | Chaplin | 210/768 |
| 4,312,762 | 1/1982 | Blackburn et al. | 210/768 |
| 4,541,927 | 9/1985 | Breidenbaugh | 37/318 |
| 5,292,442 | 3/1994 | Khan et al. | 210/751 |
| 5,354,480 | 10/1994 | Robinson et al. | 210/768 |
| 5,382,368 | 1/1995 | Sato | 210/768 |

OTHER PUBLICATIONS

Andritz MSX–S8–LP Continuous Pressure Filter, 2 pages.
Maneuverable Dredger, Model No: Rotomite 142P; Crisafulli Pump Company Drawing CPC–91124B, Dated Jan. 25, 1993.
Mark J. Hammer, Water and Wastewater Technology, ©1986 pp. 244–245.

Primary Examiner—Robert J. Popovics
Attorney, Agent, or Firm—DeLio & Peterson; Kenneth A. Koch

[57] ABSTRACT

A method is disclosed for remediating ponds and other water sites containing sludge and other waste materials by a dredging and dewatering process which is economical and efficient, uses relatively low cost equipment and provides for high remediation rates. The preferred process dredges the site to produce a sludge which is screened to remove oversize material. The screened sludge is then thickened and the thickened sludge dredged and fed as a uniform thickened sludge mixture to a filter press to dewater the sludge producing a final sludge product having a high solids content. A coagulant is preferably added to the sludge and a polymer and/or coagulant added to the thickened sludge filter press feed.

8 Claims, 1 Drawing Sheet

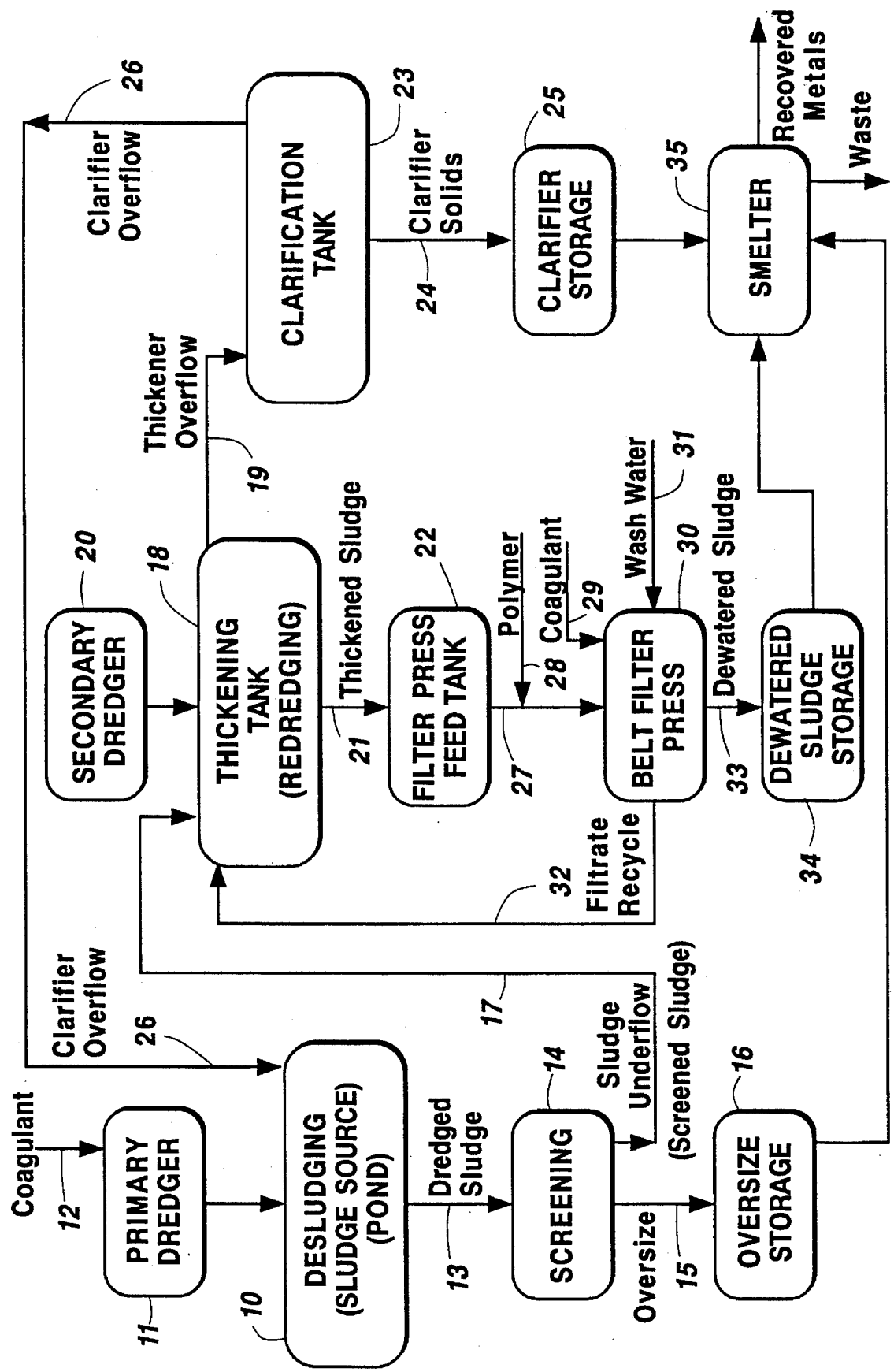

SLUDGE DREDGING AND DEWATERING PROCESS

BACKGROUND OF THE INVENTION

1. Field of the Invention

This invention relates to the remediation of ponds and other sites which contain sludge and, in particular, to an economic and efficient process for dredging and dewatering the sludge to produce a solid sludge material which can be disposed of in an environmentally safe manner and/or further treated to recover metals and other valuable materials in the sludge before disposal.

2. Description of Related Art

One of the most important global problems is the protection of the environment. Solutions are needed for our environmental problems from both a preventive stand point and the clean-up of existing environmental hazards.

Government and industry have recognized these problems and have adopted over the years a number of environmental safety measures to minimize the discharge of wastes and toxic materials into the environment. One approach is the use of ponds to contain waste streams which may then be treated and disposed of in an environmentally safe manner. The remediation of water containing polluted sites including waste process ponds at industrial sites and other water sites where sediment, sludge and other wastes including hazardous and toxic materials have accumulated is the next step for the safe removal and disposal of these polluting materials.

Remediation is basically the process of removing wastes and hazardous materials from a site and returning of the site to its original condition. Typically, industrial ponds and other water sites containing waste materials produce a sludge or silt at the bottom of the pond which contains the bulk of the potentially polluting and toxic material in the pond and this material must not only be removed so that the pond is remediated but also the sludge must be disposed of in an environmentally acceptable manner.

The remediation of ponds and other water sites containing waste materials is generally accomplished by conventional dredging and dewatering systems employing a multi-step process. Firstly, pond bottom sludge is removed and pumped to onshore equipment where the sludge is then screened for removal of oversized material such as rocks, bricks and other debris. The screened sludge (also termed "sludge underflow") which contains most of the sludge is pumped directly to a filter press feed tank from which the sludge is pumped to a filter press for dewatering. A polymer is usually added to the sludge stream at the filter press inlet to aid in dewatering. Pressed and dewatered sludge, now in cake form, is transferred to a disposal site or storage area.

Dredging is basically marine excavation whereby a dredge mounted on a barge or boat removes the sludge from the site. There are two basic types of hydraulic dredges, one being the clamshell or bucket and the other being a suction dredge. The suction dredge uses a movable suction pipe which is lowered to the bottom of the site and which often has a rotating cutter head at the bottom end. The cutter churns up the bottom and pumps on the barge or boat or at the cutter suck up the water and sludge suspended in it and transport the sludge to land for dewatering.

While conventional dredging and dewatering processes are adequate for many remediation projects, improvement is needed in the process to provide a more efficient and effective process employing a relatively small amount of low cost commercially available equipment yet still providing high production (remediation) rates and greater control of the process. One aspect of the efficiency of the process is the need to provide substantially clear process water return to the pond being remediated. An additional aspect of the improved process is to provide a thickened even sludge feed to the press which increases press production and can produce a sludge cake drier than sludge cakes produced in conventional remediation processes.

Bearing in mind the problems and deficiencies of the prior art, it is therefore an object of the present invention to provide a remediation process for ponds and other water sites containing waste materials which is efficient and economic and which has high production (remediation) rates.

Other objects and advantages will be readily apparent from the following description.

SUMMARY OF THE INVENTION

It has now been found that industrial ponds and other water sites containing wastes such as sludge may be efficiently and effectively remediated by removing the sludge from the site and dewatering the sludge using a process which provides for increased remediation rates and substantially clear return flow streams to the site being remediated. Broadly stated, a method for dewatering sludge in a remediation process comprises:

separating oversize materials in the sludge to produce a screened sludge or sludge underflow stream, which stream is preferably substantially uniform;

thickening the screened sludge in a tank or other separator or settler to produce a thickened sludge and an overflow stream, which overflow stream is preferably substantially clear;

feeding the thickened sludge as a substantially uniform mixture to a filter; and filtering the thickened sludge to produce a dewatered sludge material.

In one aspect of the invention, the sludge is obtained from the site being remediated by dredging. While any form of dredging can be used, it is preferred that a portable floating dredge machine be used having a submerged sludge pump and which moves over the surface of the site being remediated as it dredges the site.

In another important aspect of the invention, the sludge after being treated to remove oversized materials is thickened in a tank in which the solids settle to the bottom of the tank. Water overflow leaving the thickening tank is substantially free of suspended solids and is preferably totally directed to a clarification tank for removal of any residual suspended solids before return to the site being remediated. Water overflow from the clarification tank is directed back to the site being remediated. Thickened sludge is removed from the bottom of the thickening tank preferably by dredging and the dredge is preferably similar although smaller than tile dredge used at the site being remediated and is in the form of a portable floating dredge machine which travels over the surface of the site being dredged. The thickened sludge is then transferred as a uniform mixture to a filter press for dewatering to the final waste sludge product.

In a further aspect of the invention a coagulant is added to the sludge to enhance sludge settling in the thickener and is preferably added at the suction of the primary dredge, but can be added at any point, preferably prior to the thickening tank. A polymer and i additional coagulant is preferably added to the thickened sludge filter press feed to enhance dewatering of the sludge in the filter.

BRIEF DESCRIPTION OF THE DRAWINGS

The FIGURE is a schematic view of one embodiment of the invention.

DESCRIPTION OF THE PREFERRED EMBODIMENT(S)

The FIGURE shows a schematic diagram of a sludge dredging and dewatering method of the invention for remediating a pond. The site 10 to be remediated may be an industrial pond or other such water site containing sludge or other such waste and is dredged using a primary dredger 11. Any dredging device may be employed as is known to those skilled in the art and, in general, the primary dredge removes the pond bottom sediment in a slurry form called sludge which dredged sludge typically contains about 10–20% solids by weight, usually about 15%. A typical solids concentration in undisturbed pond sediment is about 45% based on a specific gravity of dry solids of 2.7. The preferred primary dredge 11 is a floating, 8-inch horizontal auger/tiller cutterhead, with a submerged centrifugal sludge pump and is a fully self-contained, diesel powered vessel controlled by an on-board operator. A typical dredge is manufactured by SRS Crisafulli, Inc. as Model No. 8X10230. It is preferred that a coagulant be added through line 12 at the suction of the dredge to enhance sludge settling further on in the process. Typical coagulants are Percol 344 and Nalco 94DC045 and will generally will be used in an amount of about 100 ppm to 300 ppm (parts dry solids of coagulant to 1 million parts dry solids of the sludge feed). The preferred coagulant is Percol 344 sold by Allied Colloids.

The dredged sludge stream is pumped to screen 14 through conduit 13. A vibatory screen is preferred and the screen removes solid materials over, e.g., one (1) millimeter (mm) in size. Any screen size can be employed with a general range of sieve sizes being 0.5 to 2 mm. These solids materials are bricks, wood, coarse sand, rocks and other debris which, if not removed, would cause plugging of valves and pumps. Oversize materials removed by the screen are transported via line 15 and fall into a hopper where they are removed on a regular basis and hauled by a truck to a storage area 16. The sludge underflow fraction ( also termed "screened sludge") which passes through the screen is pumped to a sludge thickening tank 18 via conduit 17.

The sludge thickener is preferably a large tank which is generally rectangular and flat bottomed and may range in size up to 40 feet wide to 200 feet long to 4 feet deep and larger. The purpose of thickening tank 18 is to remove water from the screened sludge and to produce a thicker (higher solids content) and more uniform sludge than that obtained by prior art methods such as by only employing a screen before filtering. A thickened, uniform sludge flow to the filter is an important aspect of the invention to provide high efficiencies and high production rates.

The tank 18 permits the incoming sludge time to settle to the bottom of the tank where the sludge gradually consolidates. As screened sludge enters the thickening tank 18 a thickener overflow stream which is mainly water (usually up to 0.05% solids) is directed through conduit 19 to clarification tank 23. Clarification tank 23 is similar in dimension and design for most purposes to thickening tank 18. In the clarification tank 23 any residual sludge solids are allowed to settle. The clear or substantially clear clarification tank overflow is returned to the process pond 10 being remediated through conduit 26. Depending upon the amount of solids which build up in the clarification tank 23 these solids are removed through line 24 to a clarifier storage area 25. It is expected that the clarifier tank 23 normally will only require cleaning and removal of sludge solids upon completion of the remediation project. The clarifier tank sludge solids may be recycled to the thickening tank 18 or press feed tank 22 for certain remediation projects.

Thickened sludge in thickening tank 18 may be removed by any suitable means and it is shown being highly preferably removed using a secondary dredge 20, which method has been found to produce higher remediation efficiencies at a low overall remediation cost. The secondary dredge is preferably a floating, 4-inch horizontal auger/tiller cutterhead type and, like the primary dredge 11, is fully self-contained, diesel powered, and controlled by an on-board operator. A preferred dredge is manufactured by SRS Crisafulli, Inc. as Model No. Rotomite 142P. The solids concentration by weight of the dredged thickened sludge is about 25 to 35% generally about 30% and is transferred via conduit 21 to filter press feed tank 22.

The filter press feed tank 22 is preferably agitated and divided into separate mixing compartments and provides a uniform feed mixture to the filter press 30. There is no significant settling of sludge solids in the filter press feed tank 22. A coagulant and polymer may be added to the filter press feed tank 22 or preferably the polymer is added inline into filter press feed line 27 through line 28 and the coagulant is then added at the filter press through conduit 29. It is preferred to use both a polymer and a coagulant in the filter press feed although each could be used singly. The polymer forms a long chain molecule with the sludge and aids in forming a floc. The coagulant aids in the flocs being combined into a more coherent, filterable mass. The polymers are generally used at a level off abut 100–200 ppm (parts dry solids polymer to 1 million parts dry solids of the sludge). The coagulant is generally used at a level of about 100–300 ppm on the same basis. Greater of lesser amounts may be used for certain applications. Typically polymers are Nalco N9601 (Nalco Chemical Co.) and Percol 727 and Percol E24 (Allied Colloids). Nalco N9601 is preferred. Typically coagulants are Nalco 94DC045 and Percol 344. Nalco 94DC045 is preferred.

Belt filter press 30 is a conventional belt filter press wherein wash water is added through conduit 31 to the inlet of the filter press. The filtrate and wash water are transferred through conduit 32 and preferably recycled to the thickening tank 18. Dewatered sludge now contains about 55–67%, preferably about 60–64% solids by weight, and is removed by conveyor 33 to dewatered sludge storage area 34. Any suitable filter may be used and the % solids in the dewatered sludge may also be varied depending on project requirements.

In the preferred belt filter press 30, sludge first enters a gravity drainage section where the free water drains away. Additional water is then removed by progressive compressing of the sludge between two belts and a series of rollers. The mostly dewatered sludge exits the press in cake form where a conveyor system transfers it to storage area 34 for loading into haul trucks. Solids from storage areas 16, 25 and 34 may be treated individually or combined and transferred to smelter 35 to recover metals and other valuable materials. A preferred belt filter press is the ANDRITZ SMX-S8-LP (Low Profile) Continuous Pressure Filter (CPF). The press utilize three (3) separate zones for maximum dewatering efficiency—Gravity, Wedge and High Pressure.

EXAMPLE

Sludge containing pond 10i is dredged using an SRS Crisafulli, Inc. Dredge Model No. 8X10230 and provides a sludge stream containing about 15% total solids (TS) by weight at 1100 gallons per minute (gpm). Coagulant Percol 344 is added to the inlet of the dredge at 200 ppm weight coagulant to weight sludge solids. Screening 14 provides an oversize fraction of 7500 pounds per hour (lbs/hr). Screened sludge is pumped at 1180 gpm into thickening tank 18 producing a thickener overflow of 780–1180 gpm (0.05%TS) which is fed to a clarifier tank. An intermittent thickened sludge of 400 gpm (30%TS) is fed to filter press holding tank 22. A clarifier overflow 780–1180 gpm is returned to pond 10 with the overflow containing turbidity<15NTU. A mixed thickened sludge at 300 gpm is fed from the holding tank to filter press 30 with a polymer Nalco N9601 added inline at 150 ppm followed by coagulant Nalco 94DC045 added at 200 ppm at the filter. 200 gpm of wash water is fed to belt filter press 30. 400 gpm of filtrate and wash water is recycled to thickening tank 18. 50,000 lb/hr of sludge cake of about 60–64% TS is obtained and transferred to storage.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A method for the remediation of water sites containing waste solids in the form of a sludge which accumulates at the bottom of a site comprising:

dredging the site using a suction dredge to remove the sludge in the form of a water slurry containing waste solids;

separating oversize waste solids in the sludge to produce a screened sludge;

transferring the screened sludge to a tank in which waste solids in the slurry settle to the bottom of the tank;

dredging the settled waste solids in the tank using a portable floating suction dredge machine to produce a thickened sludge having a higher solids content than the screened sludge;

feeding the thickened sludge as a uniform mixture to a filter; and filtering the thickened sludge to produce a filtrate and a solid sludge material for disposal.

2. The method of claim 1 wherein the site is dredged using a portable floating dredge machine.

3. The method of claim 1 wherein the filter is a belt filter press.

4. The method of claim 3 wherein coagulant is added to the sludge before dredging the settled waste solids in said tank.

5. The method of claim 4 wherein polymer and coagulant are added to the thickened sludge feed to be filtered.

6. The method of claim 5 wherein an overflow stream from the tank is fed to a clarifier tank to produce clarifier sludge solids and a clarifier overflow stream which is returned to the water site being remediated.

7. The method of claim 5 wherein the filtrate from the filter is recycled to the tank.

8. The method of claim 1 wherein an overflow stream from the tank is fed to a clarifier tank to produce clarifier sludge solids and a clarifier overflow stream which is returned to the water site being remediated.

* * * * *

UNITED STATES PATENT AND TRADEMARK OFFICE
CERTIFICATE OF CORRECTION

PATENT NO. : 5,575,921

DATED : November 19, 1996

INVENTOR(S) : Ronald C. Askin, Robert J. Kimball and Sanna M. Yost

It is certified that error appears in the above-identified patent and that said Letters Patent is hereby corrected as shown below:

Column 2, line 58: "than tile" should read - - than the - - .
Column 2, line 67: " i" should be deleted.
Column 4, line 37: "off abut" should read - - of about - - .
Column 4, Line 67: "utilize" should read - - utilizes - - .
Column 5, line 5: "10i" should read - - 10 - - .

Signed and Sealed this

Eighteenth Day of February, 1997

Attest:

BRUCE LEHMAN

Attesting Officer

Commissioner of Patents and Trademarks